Sept. 2, 1941.  C. A. OLCOTT  2,254,389
MEANS FOR PREVENTING THE DILUTION OF SUGAR BEARING MATERIALS
Filed April 15, 1939
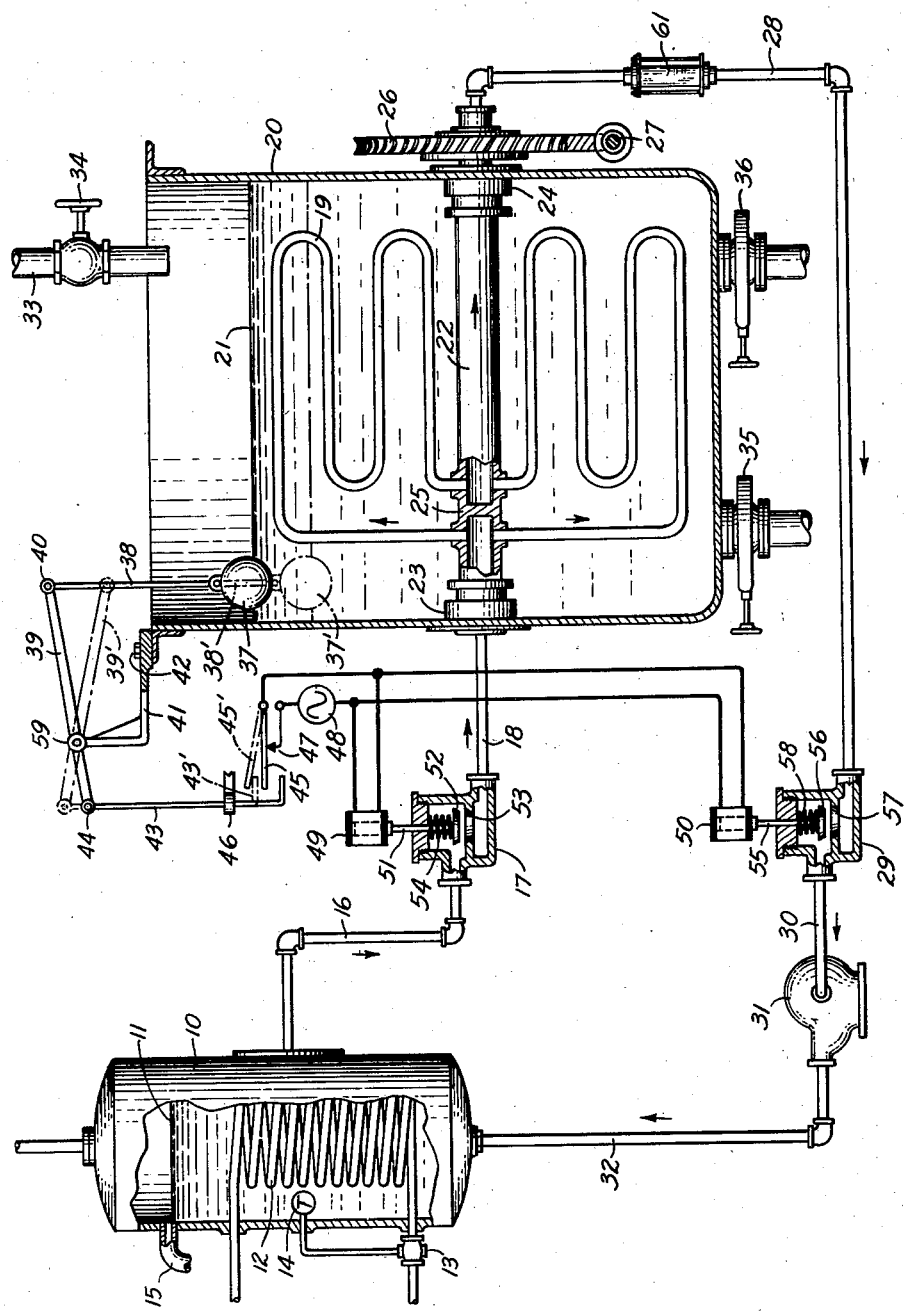
INVENTOR
C. A. OLCOTT
BY
ATTORNEY Patented Sept. 2, 1941

2,254,389

UNITED STATES PATENT OFFICE 2,254,389

MEANS FOR PREVENTING THE DILUTION OF SUGAR BEARING MATERIALS

Charles A. Olcott, West Milford, N. J.

Application April 15, 1939, Serial No. 268,004

7 Claims. (Cl. 127—17)

This invention relates to the processing of sugar bearing materials and more particularly to methods and means of preventing the dilution of sugar bearing materials during processing.

An object of this invention is to insure the purity of sugar bearing materials.

Another object of this invention is to maintain substantially the concentration of sugar bearing materials under the various conditions encountered in the processing of these materials.

Another object of this invention is to minimize the effect of leakage of fluid medium into sugar bearing materials in systems for the conditioning of these materials.

A more particular object of this invention is to prevent any substantial amount of fluid medium ordinarily in heat exchange relation with sugar bearing materials for purposes of temperature conditioning from passing into the materials when a leak occurs in the coil through which the fluid medium circulates.

Crystallizers and mixers employed in conditioning sugar bearing materials within a limited temperature range ordinarily include coils of the rotating type through which hot water circulates to impart the required heat energy for attaining the desired temperature range. It is of paramount importance that the concentration of the material be maintained before extraction of the sugar in the centrifugal machine and that no water be introduced to dilute the sugar precipitated throughout the material. At times, a leak occurs in the coils of the mixer or crystallizer. Leaks in the coils of crystallizers or mixers are caused principally by two conditions. Due to the viscous consistency of the magma or other sugar bearing materials, the rotating coils are subjected to considerable strain. While the coils may be designed to be strong enough to withstand the strain resulting from the stirring of the sugar bearing material of normal consistency, at times they revolve in more viscous material. For example, due to the low temperature of the material introduced in the crystallizer or mixer, or some deficiency of the heating apparatus, the viscosity of the material may be substantially greater than that for which the coils are designed. The excessive strain resulting from this condition frequently causes leaks at the joints of the coils. Another cause of leaks is corrosion, which at times is quite rapid, by the sugar bearing materials, particularly those of the lower grades. The leaks may be large or small. If they are large, excessive dilution of the particular charge of material in the mixer or crystallizer immediately results. If they are small, many times they are not perceptible to casual inspection and over a period of days or weeks the amount of water leaking from the coils is sufficient to dissolve a considerable amount of sugar although the rate of water passing into the sugar bearing material may be relatively small. Whether large or small, leaks in the coils of the apparatus used in the processing of sugar bearing material involve a decided economic loss.

In accordance with this invention, the usual resulting consequence of leaks occurring in the coils employed for the heating of sugar bearing materials, whether they be in the mixers, crystalizers, or other containers, are substantially avoided. The fluid medium, such as hot water, which ordinarily circulates through the coil is maintained at such a pressure with respect to that of the sugar bearing material immediately adjacent to the coils that when a leak occurs in the coils, the fluid medium tends to remain in the coils and, if anything, the sugar bearing material tends to flow into the fluid medium. Preferably, the pressure of the fluid medium is approximately equal to or slightly less than that of the sugar bearing material in the tank. As a consequence, the material tends at the point of the leak to flow into the fluid medium such as hot water circulating through the coils. On the other hand, if the pressure inside the coils were higher—the condition which prevails in systems of the prior art—the water or other fluid medium would tend to flow into the material. This tendency is increased by the mobility of the fluid medium such as water and the viscous nature of the sugar bearing material, a much greater quantity of water, for example, being capable of passing into the material for a particular size orifice and particular differential in pressure than that of the material into the water. Sometimes the height of the coils in the crystallizer is relatively near the top level of material in the tank when the tank attains its full capacity. In these mixers, crystallizers, or other devices employed in the processing of sugar, material is constantly withdrawn and new additions made thereto. Accordingly, when the level of the material falls, the pressure of the material in proximity to the coils is reduced. When these conditions are present, the pressure of the fluid medium, in accordance with this invention, is also reduced to insure that the fluid medium does not leak into the magma.

In a specific embodiment, the pressure of water circulating through the rotating coils employed for the temperature conditioning of sugar bearing materials is maintained at a pressure not in excess of that of the magma immediately adjacent to the coils by setting a predetermined level for the water in the tank, supplying the water to the coils and locating the pump ordinarily required to insure the circulation of water in the system so that it does not contribute to any increase in the pressure of the water in the coils. The pump, which in systems of the prior art increases the pressure of the water in the rotating coils, is, in accordance with this invention, located in the return pipe line from the coils to the tank. In the embodiment, it not only cannot cause any increase in the pressure of the water within the coils, but actually lowers the pressure of the water therein by establishing a reduced pressure in the return line.

A more comprehensive understanding of the invention is obtained by reference to the accompanying drawing which represents apparatus employed in a specific embodiment of this invention.

A tank 10 is normally filled with water 11 or some other fluid medium. The water is heated by a plurality of coils 12 through which steam passes. The steam is admitted through a valve 13 controlled by a thermostat 14. The valve 13 is adjusted so that sufficient steam is admitted to the coils 12 to insure that the hot water in the tank 10 is within a desired temperature range. Water is supplied to the tank 10 as required from a source not shown. The water is maintained in the tank 10 at a predetermined level by means of this supply and an overflow pipe 15. When the water in the tank 10 rises above the predetermined level, the excess passes out of the pipe 15. The means of supply of water is provided with a device such as a float valve which insures that water is supplied to the tank whenever the water 11 falls below a predetermined level. The critical level is, of course, determined by the position of the overflow pipe 15 and the regulation of the supply of water to the tank. In the embodiment shown in the drawing, the tank 10 is supplied with water whenever the level falls below that of the overflow pipe 15 and any excess is quickly disposed of through that pipe.

From the tank 10 the hot fluid medium such as hot water passes through a conduit or pipe 16 to a valve 17 and then through a conduit or pipe 18 to a plurality of rotating stirring coils 19 located in a tank 20 in which magma, massecuite, or other sugar bearing material 21 is contained.

The rotating stirring coils may be constructed in accordance with the system described in the copending application of applicant Serial No. 160,178, filed on August 20, 1937. The rotating coils 19 are fixedly attached to a hollow shaft 22 supported by two bearings 23 and 24. A baffle or wall 25 serves to direct the water from the conduit or pipe 18 to the outer coils initially as described in the above stated application of applicant. The shaft 22 is rotated by a worm wheel 26 and a worm gear 27 driven by some suitable source of power not shown.

From the hollow shaft 22, the water or other fluid medium passes through a conduit or pipe 28 to a valve 29. The water is transmitted through a conduit or pipe 30 to a pump 31 and thence through a conduit or pipe 32 to the tank 10. Unlike the usual arrangements in system for the conditioning of sugar bearing material, the pump 31 is located in the return line from the coils 19 to the tank 10 instead of between the pipe 16 and the coils 19. As a consequence, the pump 31 cannot cause any increase in the pressure of the water in the coils 19. As a matter of fact, the action of the pump 31 tends to decrease the pressure of the water within the coils 19 by establishing a partial vacuum or reduced pressure in the return line.

The level of the water 11 is preferably arranged so that the pressure of the fluid medium in the rotating coils 19 does not exceed that of the magma immediately adjacent to the coils in the tank. The flow of hot water through the coils in the specific embodiment shown in the drawing depends principally upon the height of the water in the tank 10 in relation to the top of the coils 19 and the action of the pump 31 in the return line. Both the height of the water in the tank 10 and the rate at which the pump 31 functions are readily adjusted to control the supply of water to the coils 19 to impart sufficient heat energy to the magma in the light of the known tempo of the charging of cold magma and the discharging of the temperature conditioned magma to insure that the discharged material is within the required temperature range. The height of the hot water in the tank 10 is adjusted by fixing the overflow pipe 15 at a particular position to achieve this end and the rate of rotation of the pump usually operated by an electric motor can readily be controlled. Preferably, the tank 10 is located at a height with respect to the rotating coils so that the desired pressure of water in the coils can be obtained. The pressure of the hot water in the coils 19 does not exceed that of the magma immediately adjacent thereto. It is desirable that the water at any point in the coils 19 be at a pressure which does not exceed that of the magma or other sugar bearing material immediately adjacent thereto when the level of the material 21 in the tank 20 is at the lowest depth ordinarily encountered in the operation of the temperature conditioning apparatus. With such a system, inasmuch as the approximate densities of magma and water are about 1.5 and 1.0 respectively, the pressure of the water does not exceed that of the magma regardless of its height above the minimum depth. When a leak occurs in the coils 19, since the pressure of the hot water therein does not exceed that of the magma immediately adjacent thereto, the magma or other sugar bearing material flows into the coils and the magma is not diluted.

It is preferred that the pressure of the water or other fluid medium in the coils, although not in excess of that of the magma immediately adjacent to the coils, approximate that of the magma; for even though the magma or other sugar bearing material be viscous, with its resulting difficult passage through a small orifice causing the leak, the amount passing through to the water in coils is directly correlated with the pressure differential between the sugar bearing material and the water. If this differential were relatively large, a substantial amount of magma might well pass into the water and be lost. To avoid this situation, the differential in pressure between the water in the coils and the sugar bearing material is preferably at a minimum, always, of course, maintaining the pressure of water in the coils not in excess of that of the magma immediately adjacent thereto.

Means are provided for detecting the presence of a leak in the stirring coils 19. In the embodiment shown in the drawing, this means comprises a sight glass 61 located in the return pipe or conduit 28. If a leak occurs in the coils 19, since the pressure of the magma or other sugar bearing material is greater than that of the water immediately adjacent thereto, the magma passing into the hot water in the stirring coils discolors the water in the return line. This discoloration can readily be seen through the sight glass 61. This glass affords an excellent means of detecting the presence of a leak visually, particularly when low grade magmas are being conditioned in the tank 20. A beam of light may be arranged to pass through the sight glass to a photo electric cell which in turn actuates a visual signal, such as a red light, or an audible signal, such as an electric bell. The design of the photo electric cell and the intensity of the light are such that when the water is discolored due to a leak, the signal is operated. Alternately, electrodes may be placed in any part of the circulating hot water. The electrodes are connected to an electric circuit for the operation of a visual or audible signal. Since the conductivity of the water is markedly increased by the presence of a small amount of the sugar bearing material, a greater amount of current flows between the electrodes when a leak occurs in the stirring coils. The electrical current to which the electrodes are connected is adjusted to actuate the warning signal when the water in the circulating system is contaminated by the presence of a small amount of sugar bearing material. While the sight glass 61 or the electrodes may be located in any part of the circulating system, it is preferred that they be placed in the return line from the stirring coils 19 to the tank 10.

In the event that the level of the sugar bearing material in the tank 20 is lowered to a depth at which, normally, the pressure in the coils 19 due to the height of the water in the tank 10 and the operation of the pump 31 exceeds that of the material, provision is made to reduce the pressure in the coils 19 in response to this lowering. The sugar bearing material is supplied to the tank 20 through a pipe or conduit 33 and valve 34. After conditioning, it is withdrawn through one of a plurality of valves 35 and 36. Ordinarily, the magma 21 in the tank 20 is maintained at a constant level. On occasion, however, due to the withdrawal of the material from the tank, the level of the magma 21 falls below that at which the pressure of the water circulating in the coils 19 is lower than that of the magma or other sugar bearing material immediately adjacent thereto. For example, if the tank 20 is a mixer and a crystallizer supplying the mixer has been emptied, there may be some delay before a new crystallizer is opened to discharge the magma or other sugar bearing material into the mixer 20. During this interval, the centrifugals into which the sugar bearing material 21 is discharged are in continuous operation and the level of the magma in the mixer is substantially lowered. Under these conditions, the pressure of the sugar bearing material 21 in proximity to the coils, which is normally greater than that of the water in the coils, would be less as a result of the lowering of the sugar bearing material 21. Should a break exist in the coils 19 under these conditions, the water therein would tend to flow into the sugar bearing material 21. To avoid dilution of the sugar bearing material under these conditions, the pressure of the water in the coils 19 is reduced to retard any tendency of its flowing into the sugar bearing material. This reduction in presusre of the water in the coils 19 when the level of the magma 21 falls below a predetermined level is accomplished by the two valves 17 and 29. These valves are closed when the level of the sugar bearing material 21 falls below a predetermined depth. A float ball 37 is adapted to float on the surface of the magma 21 in the tank 20. Fixedly attached to the float ball 37 is a rod 38 joined at one end of a lever 39 by means of a pintle 40. The lever 39 turns about a fulcrum 59 supported by a bracket 41 fixedly attached to the tank 20 by means of a bolt 42. The other end of the lever 39 is attached to one end of a rod 43 by means of a pintle 44. The other end of the rod 43 forms a right angle to control by the vertical movement thereof a switch arm 45. A support 46 serves to guide the movement of the rod 43. The switch arm 45 is adapted to engage a contact 47 to connect a source of power 48 to a solenoid 49 associated with the valve 17 and another solenoid 50 associated with the valve 29. The solenoid 49 actuates a piston 51 fixedly attached to a valve head 52. The valve head 52 engages a valve seat 53 to stop the flow of hot water to the coils 19. The valve head 52 is normally biased to engage the seat 53 by means of a helical spring 54 which surrounds the piston 51. The valve head 52 is held out of engagement with the seat 53 by the energization of the solenoid 49. The energization of the solenoid 50 actuates a piston 55 fixedly attached to the valve head 56 of the valve 29. The valve head 56 engages a valve seat 57 to stop the flow of water from the pipe 28 to the pipe 30. The valve head 56 is biased to engage the valve seat 57 by a helical spring 58 which encircles the piston 55. The energization of the solenoid 50, however, results in the disengagement of the valve head 56 from the valve seat 57 to permit the flow of water from the coils 19 to the tank 10.

The switch arm 45 is arranged so that when the float ball 37 falls below a predetermined level, it is disengaged from its associated contact 47 to withdraw the source of power 48 from the solenoids 49 and 50 to close respectively valves 17 and 29. As a result, no water flows from the tank 10 to the coils 19 nor from the coils 19 to the tank 10, and the pressure created by the water in the tank 10 is removed. The pressure of the water in the coils 19 is materially reduced so that, in the event of a break in the coils under these conditions, it does not exceed that of the sugar bearing material even though the level of the material is lowered. The dotted configuration of float ball 37', rod 38', lever 39', rod 43', and switch arm 45' represents the position of float ball 37, rod 38, lever 39, rod 43 and switch arm 45 respectively when the magma 21 has fallen below the predetermined level. When the height of the magma 21 rises above the predetermined level, the switch arm 45 engages its associated contact 47 to connect the source of power 48 for the energization of solenoids 49 and 50. Hot water again flows from the tank 10 to the coils 19 and from the coils 19 to the tank 10, as a result of the disengagement of the valve head 52 from its associated valve seat 53 and the valve head 56 from its associated valve seat 57.

If a break occurs in the coils 19 and the level of the sugar bearing material 21 is above the predetermined depth for which the switch arm 45 is adjusted, the pressure of the water in the coils 19 is such that no appreciable quantity thereof flows into the sugar bearing material 21. If the depth of the magma or other sugar bearing material 21 is below the predetermined level, the pressure of the water in the coils 19 is reduced due to the closing of the valves 17 and 29 and the water in the coils 19 does not flow into the sugar bearing material since the pressure of the water in the coils 19 does not exceed that of the material. Under these latter conditions, the requirement of heat for the sugar bearing material is substantially less than that necessary when the tank is full, since no cold material is flowing into the tank from the supply pipe 33 and the amount of the material in the tank is substantially reduced. The predetermined level of the magma is preferably the point at which the sugar bearing material 21 adhering to the coils when in their rotation they rise above the surface thereof is in danger of caramelization or substantial injury. In this manner, two results are effected: one, the prevention of any substantial dilution of the sugar bearing material due to a break in the rotating stirring coils when the level of the material drops to a low depth in the tank; and the other, the avoidance of destruction of the sugar bearing material due to the overheating thereof.

Means other than those specifically shown in the embodiment illustrated in the drawing may be employed for effecting a pressure of the fluid medium which prevents the dilution of the sugar bearing material. For example, a reduced pressure on the hot water 11 in the tank 10 may be used by means of vacuum apparatus instead of atmospheric pressure as utilized in the specific embodiment described. Then, too, other fluid medium such as steam may be utilized for circulating through the coils 19 and the pressure thereof adjusted to less than that of the magma or other sugar bearing material in the tank. Further, other instrumentalities may be used for insuring the reduction of pressure of fluid medium in the coils 19 when the level of the magma falls below a predetermined depth. For example, the pressure diaphragm shown in Fig. 3 of the copending application of applicant, Serial No. 261,185, filed March 11, 1939, or the mechanical arrangement shown in Fig. 1 of that application may be utilized instead of the float ball 37 and rod 43 shown in the specific embodiment. In addition, the pressure of the water in the coils 19 may be reduced by speeding up the pump 31 located in the return line in response to the lowering of the level of the magma in a manner similar to that shown in Fig. 2 of the latter copending application of applicant.

While a preferred embodiment of this invention has been illustrated and described, various modifications may be made therein without departing from the scope of the appended claims.

What is claimed is:

1. In a system for the conditioning of sugar bearing material, a container for said material, a coil rotatable within said container for heating said material, means for circulating a fluid medium through said coil at a pressure not in excess of that of said material immediately adjacent to said coil when said material is at approximately a predetermined level in said container, and means, responsive to the lowering of the material below said predetermined level, for reducing the pressure of the fluid medium in said coil.

2. In a system for the processing of sugar from sugar bearing material comprising a tank for containing said material, means for conditioning said material to attain a limited temperature change therein including means adapted for rotational movement within said tank and providing a surface in heat exchange relation with said material, supply means for supplying a fluid medium in heat exchanging relation to said surface and at a normal pressure not in excess of the said material within said tank, and means, responsive to the lowering of the level of said material in said tank below a predetermined level, for reducing the pressure of the fluid medium on said surface.

3. In a system for the processing of sugar from sugar bearing material, a tank for containing said material, a rotating hollow member within said tank having an extensive surface in heat exchange relation with said material, supply means for supplying a fluid medium to the interior of said member at a pressure not in excess of that of said material at said surface and means, responsive to the lowering of the level of said material to substantially that height at which said material adhering to said surface rises above the level of said material is materially damaged, for controlling the supply of the fluid medium to said member and for reducing the pressure of said medium.

4. In a system for the processing of sugar from sugar bearing material, a tank for containing said material, rotating coils seated within said tank in heat exchange relation with said material, means for circulating a fluid medium through said coils at a pressure approximating that of said material but not in excess of that of said material immediately adjacent to said coils, control means for reducing the circulation of fluid medium in said coils and means, responsive to a decrease in the depth of said material below a predetermined level, for actuating said control means.

5. In a system for the processing of sugar from sugar bearing material, a tank for containing said material, a hollow rotatable member in said tank providing an extended surface in heat exchange relation with said material, means for supplying a fluid medium to the interior of said member at a pressure not in excess of that of said material immediately adjacent to said surface, said means including a container for the storage of the fluid medium in which the fluid medium is subjected to atmospheric pressure and maintained at a substantially constant level above that of the said material in said tank, and a pump for circulating the fluid medium to and from said member without increasing the pressure of the fluid medium supplied to said surface, said pump being positioned to withdraw said fluid medium from said member.

6. In a system for the processing of sugar from sugar bearing material, a tank for containing said material, a heating coil in said tank having a fluid medium circulating therein, means for rotating said coil, a pump for withdrawing the fluid medium from said coil, a container open to the atmosphere for receiving the fluid medium withdrawn from said coil and for supplying the fluid medium to said coil, the level of the fluid medium in said container being higher than the normal level of said material in said tank but not sufficient to cause a pressure in any part of said coil in excess of the static pressure of said material surrounding that part of said coil, and means for reducing the pressure of the said fluid medium within said coil, said last-mentioned means being responsive to a drop in the level of said material substantially below said normal level, whereby said fluid medium is maintained constantly at a pressure such as to inhibit leakage thereof into said material.

7. A hot mingling system for the temperature conditioning of sugar magma or the like comprising an open tank for containing the magma, a heater-stirrer coil within said tank and means for rotating said coil, a reservoir for heating fluid and means for circulating said heating fluid from said reservoir through said coil and back to said reservoir, said last-mentioned means comprising a pump in the return to said reservoir, means for maintaining the heating fluid in said reservoir at such level above the normal magma level in said tank that the normal static pressure of said magma is at each point of said rotating coil only slightly in excess of the pressure of said heating fluid at each said point, means responsive to a reduction of the level of said magma to a predetermined subnormal level, and a controller actuated by and in response to operation of said responsive means for reducing the pressure of said fluid in said coil whereby said fluid is maintained at a pressure not exceeding the reduced static pressure of said magma.

CHARLES A. OLCOTT.